US012394401B2

(12) United States Patent
Cariou

(10) Patent No.: US 12,394,401 B2
(45) Date of Patent: Aug. 19, 2025

(54) POROUS SKIN COMPRISING A PLURALITY OF STRIPS AND AN ACOUSTIC ATTENUATION PANEL COMPRISING SUCH A POROUS SKIN

(71) Applicant: AIRBUS OPERATIONS (SAS), Toulouse (FR)

(72) Inventor: Charles Cariou, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 175 days.

(21) Appl. No.: 17/988,404

(22) Filed: Nov. 16, 2022

(65) Prior Publication Data
US 2023/0154447 A1 May 18, 2023

(30) Foreign Application Priority Data
Nov. 17, 2021 (FR) ........................................ 2112149

(51) Int. Cl.
*G10K 11/162* (2006.01)
*B64D 33/02* (2006.01)

(52) U.S. Cl.
CPC ............ *G10K 11/162* (2013.01); *B64D 33/02* (2013.01); *B64D 2033/0206* (2013.01)

(58) Field of Classification Search
CPC .............................. G10K 11/162; B64D 33/02
See application file for complete search history.

(56) References Cited

U.S. PATENT DOCUMENTS

| 6,827,180 | B2* | 12/2004 | Wilson | B23K 26/389 |
| | | | | 181/292 |
| 6,840,349 | B2 | 1/2005 | Andre et al. | |
| 8,460,779 | B2* | 6/2013 | Gupta | F15D 1/004 |
| | | | | 428/167 |
| 10,240,576 | B2* | 3/2019 | Drack | F03D 1/0641 |
| 11,053,888 | B2* | 7/2021 | Vassberg | F02K 1/66 |

(Continued)

FOREIGN PATENT DOCUMENTS

| CA | 2 425 364 | 10/2003 |
| EP | 3 552 951 | 10/2019 |

(Continued)

OTHER PUBLICATIONS

Search Report for FR 2112149 dated Jun. 10, 2022, 2 pages.

*Primary Examiner* — Forrest M Phillips
(74) *Attorney, Agent, or Firm* — Nixon & Vanderhye P.C.

(57) ABSTRACT

A porous skin including strips and an acoustic attenuation panel. The porous skin (1) includes of strips (2) arranged transversely to a fluid flow (E) and which successively overlap each other laterally, each strip (2) upstream of said fluid flow (E) overlapping the downstream strip or strips (2), each of the strips (2) including at least one lateral edge comprising a contour defining a line with deviations, namely a broken line and/or a curved line, and the arrangement of the strips (2) and the contour or contours of their lateral edges being configured to form openings (11) between the strips (2) connecting an external face of the porous skin (1) to an internal face of said porous skin (1) and to prevent the fluid flow (E) from penetrating into said openings (11), the porous skin (1) thus being adapted to have sound waves pass through it while preventing the fluid flow (E) from passing through it.

20 Claims, 4 Drawing Sheets

(56) References Cited

U.S. PATENT DOCUMENTS

| | | | |
|---|---|---|---|
| 2004/0045766 A1* | 3/2004 | Porte | G10K 11/161 |
| | | | 181/292 |
| 2010/0133378 A1* | 6/2010 | Lidoine | F02C 7/24 |
| | | | 244/1 N |
| 2019/0061903 A1* | 2/2019 | Khorrami | G10K 11/161 |
| 2019/0161200 A1 | 5/2019 | Versaevel et al. | |
| 2019/0219000 A1* | 7/2019 | Reed | F02K 1/827 |
| 2019/0309682 A1 | 10/2019 | Porte et al. | |
| 2020/0143785 A1* | 5/2020 | Garnier | G10K 11/172 |
| 2020/0173362 A1 | 6/2020 | Riou et al. | |
| 2020/0189717 A1* | 6/2020 | Desjoyeaux | B64C 7/02 |
| 2021/0003074 A1* | 1/2021 | Gea Aguilera | B64D 33/02 |
| 2022/0074348 A1* | 3/2022 | Johnson | F02C 7/24 |

FOREIGN PATENT DOCUMENTS

| | | | | |
|---|---|---|---|---|
| FR | 2 735 064 | | 12/1996 | |
| FR | 3074148 A1 * | | 5/2019 | B32B 3/12 |
| WO | 2018/020174 | | 2/2018 | |
| WO | 2019/020933 | | 1/2019 | |
| WO | WO-2019038506 A1 * | | 2/2019 | B64C 1/40 |

* cited by examiner

POROUS SKIN COMPRISING A PLURALITY OF STRIPS AND AN ACOUSTIC ATTENUATION PANEL COMPRISING SUCH A POROUS SKIN

RELATED APPLICATION

This application incorporates by reference and claims priority to French patent application 2112149, filed Nov. 17, 2021.

TECHNICAL FIELD

The present invention concerns a porous skin for an acoustic attenuation panel and an acoustic attenuation panel comprising such a porous skin.

BACKGROUND

In many fields loud disturbing sounds are generated, for example by noisy equipment or machines, and may be undesirable. In particular, it is known that on an aircraft, for example a transport aircraft, loud noises are often generated, in particular by the propulsion systems (or jet engines) of the aircraft. For reasons of comfort and also because of standards, these noises constitute a nuisance that it is necessary to reduce.

To this end it is known to use, for example at the level of the nacelles of the jet engines, panels offering good acoustic absorption in order to reduce the disturbing sounds. In particular, there is known from the documents EP 3552951A1 (corresponding to US 2019/309682A1) an acoustic attenuation panel for an aircraft.

An acoustic attenuation panel usually and generally comprises an acoustic structure provided with a plate having good acoustic absorption properties, in particular for the frequencies of the most disturbing noises. This acoustic structure used for acoustic absorption may be a cellular material, but also a material based on foam or a fibrous material. An acoustic attenuation panel of this kind is generally also provided on one of its two faces with a porous (that is to say perforated) skin termed a "resistive" skin and on the other face with an unperforated, so-called "reflective" rear skin. The resistive skin allows the sound waves (or acoustic waves) to penetrate into the acoustic structure, where they are attenuated.

However, as the resistive skin is perforated, it can also allow a flow, for example a flow of a fluid such as air, to penetrate into the acoustic structure. A flow of this kind that enters the acoustic structure is liable to disturb the acoustic attenuation, in particular by creating undesirable phenomena that reduce the effective portion of the openings in the resistive skin. This solution is open to improvement.

SUMMARY

An inventive porous skin for an acoustic attenuation panel is disclosed herein, wherein the porous skin being intended to be subjected to a fluid flow.

In accordance with an embodiment invention, the porous skin includes a plurality of strips that are arranged transversely to the fluid flow and which, successively, overlap each other laterally, each strip upstream of the fluid flow overlapping the strip or strips downstream of said fluid flow, each of said strips includes a so-called upstream first lateral edge and a so-called downstream second lateral edge, at least one of said lateral edges having a contour forming a line with deviations, and the arrangement of the strips and the contour or contours of their lateral edges are configured to form between the strips openings connecting an external face of the porous skin with an internal face of said porous skin and to prevent the fluid flow from penetrating into said openings.

In the context of the present invention a "line with deviations" refers to a non-straight line, as specified hereinafter.

Accordingly, thanks to the invention, a porous skin is obtained that is configured so that sound waves can pass through it while being adapted, if it is subjected to a fluid flow, to prevent that fluid flow from passing through it. Also, when it is used as a resistive skin on an acoustic attenuation panel it is able, by preventing any fluid flow from passing through it, to prevent the appearance of the aforementioned undesirable phenomena and thus to remedy the disadvantage mentioned hereinabove.

Moreover, the overlapping of the strips advantageously creates contact surfaces between two successive strips and said strips are fixed together at the level of at least some of said contact surfaces.

In an embodiment, at least some of said openings are created by shapes adapted to match on the one hand the contour of the downstream lateral edge of a first strip and on the other hand the contour of the upstream lateral edge of a second strip directly downstream of said first strip, each of the openings created in this way being covered by a third strip that is directly upstream of said first strip and that overlies this first strip in the downstream direction.

In a first embodiment at least part of the contour of at least one of the lateral edges comprises a curved line.

Moreover, alternatively or additionally, in a second embodiment at least part of the contour of at least one of the lateral edges comprises a broken line.

Moreover, in aa embodiment said strips are of identical shape to one another. In another embodiment at least some of said strips are different shapes to one another.

Moreover, strips advantageously have on at least one of their lateral edges on one of their faces a discontinuity forming at least one plane surface.

The present invention also concerns an acoustic attenuation panel comprising at least one acoustic structure provided with a porous skin as described hereinabove.

Moreover, in an embodiment the acoustic structure comprises at least one cellular structure provided on one of its faces with a so-called reflective rear skin and on the other face with said porous skin.

SUMMARY OF FIGURES

The appended figures will clearly explain how the invention may be reduced to practice. In these figures identical references designate similar elements.

DETAILED DESCRIPTION

Figure 1:
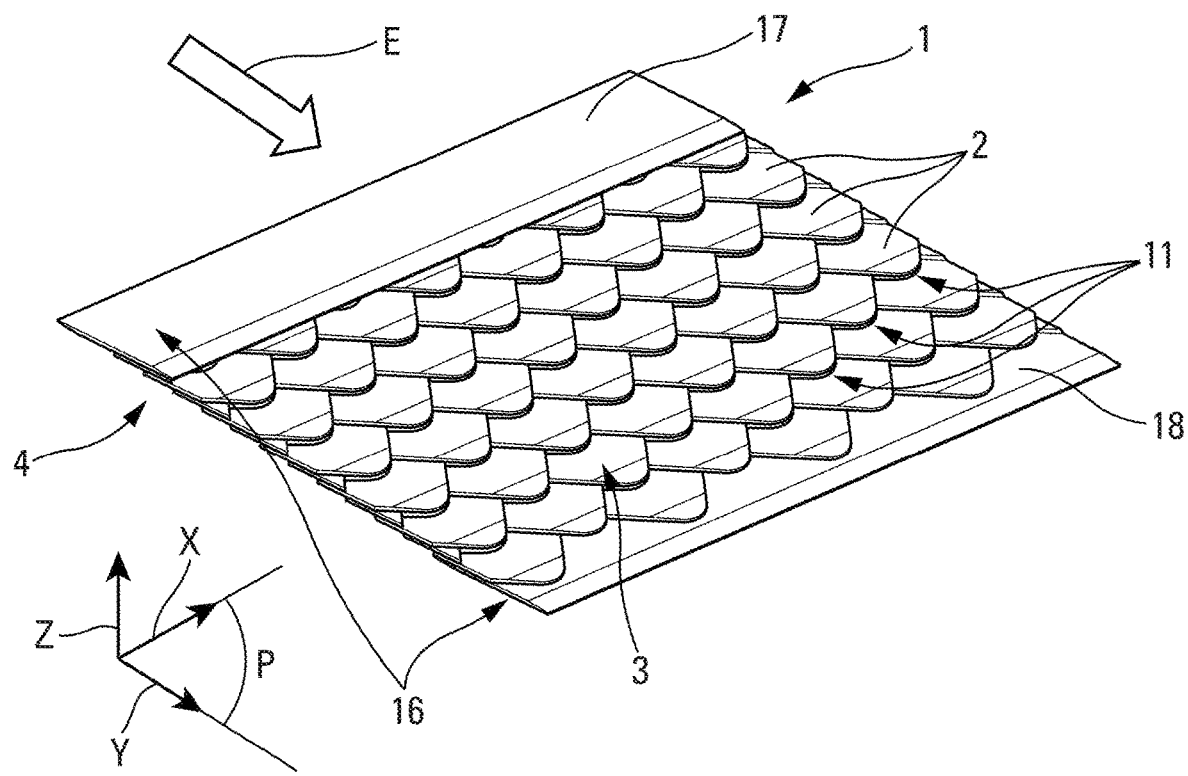
FIG. 1 is a perspective view of an embodiment of a porous skin including strips having lateral edges having a contour of sinusoidal shape.
Figure 7:
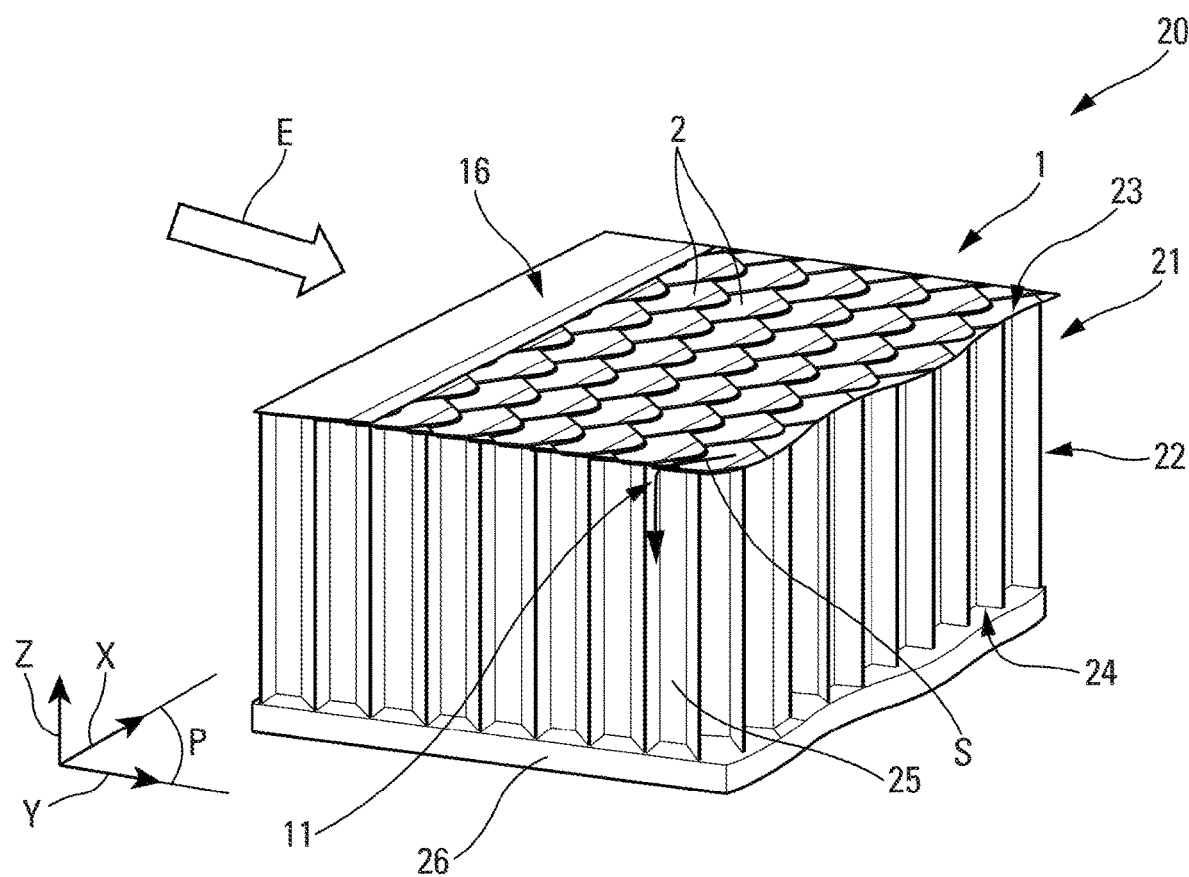
FIG. 7 is a perspective view of a part of an acoustic attenuation panel including a porous skin conforming to the FIG. 1 embodiment.

The porous skin 1 in accordance with the invention and one embodiment of which is represented schematically in FIG. 1 is a skin intended to be disposed in an acoustic attenuation panel (FIG. 7).

By "acoustic attenuation panel" is meant an element, such as a plate, intended to be fixed to a surface in order to reduce the surrounding noises, for example by trapping and/or damping sound waves (or acoustic waves). In the present description it is considered that an acoustic attenuation panel may correspond to any structure having acoustic absorption properties. There is also considered as "exterior" or "external" to such a panel the environment from which the acoustic waves to be attenuated come and as "interior" or "internal" the space contained within said panel in which said acoustic waves are trapped and/or damped.

An external face of the porous skin 1 is liable to be subjected to a fluid flow E, for example a flow of air, as illustrated by an arrow in FIGS. 1 to 7. As described hereinafter the porous skin 1 is configured to be permeable to sound waves while preventing the fluid flow E from passing through it.

To this end, as represented in FIG. 1, the porous skin 1 includes a plurality of strips 2 that successively overlap laterally. In the context of the present invention by two strips "overlapping" is meant the fact that one of said strips is overlaid on the other strip in part with surface contact. Moreover, "lateral" overlapping of two strips denotes the arrangement in the direction of the width of said strips. That arrangement will be described in more detail in the remainder of the description.

The strips 2 may be made of aluminum and have for example a thickness of the order of one hundredth of a millimeter. However, they may equally be made of other materials, and in particular of a metal other than aluminum, a plastic material or a composite material.

Figure 2:
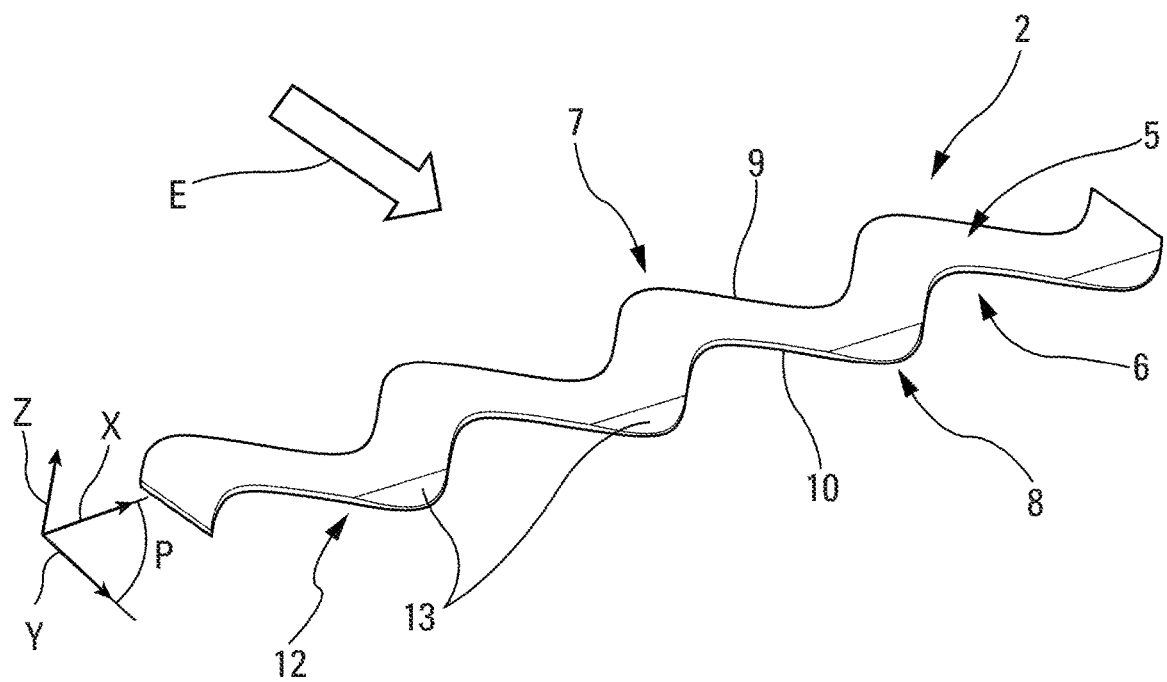
FIG. 2 is a perspective view of one particular embodiment of a strip of the porous skin from FIG. 1.
Figure 3:
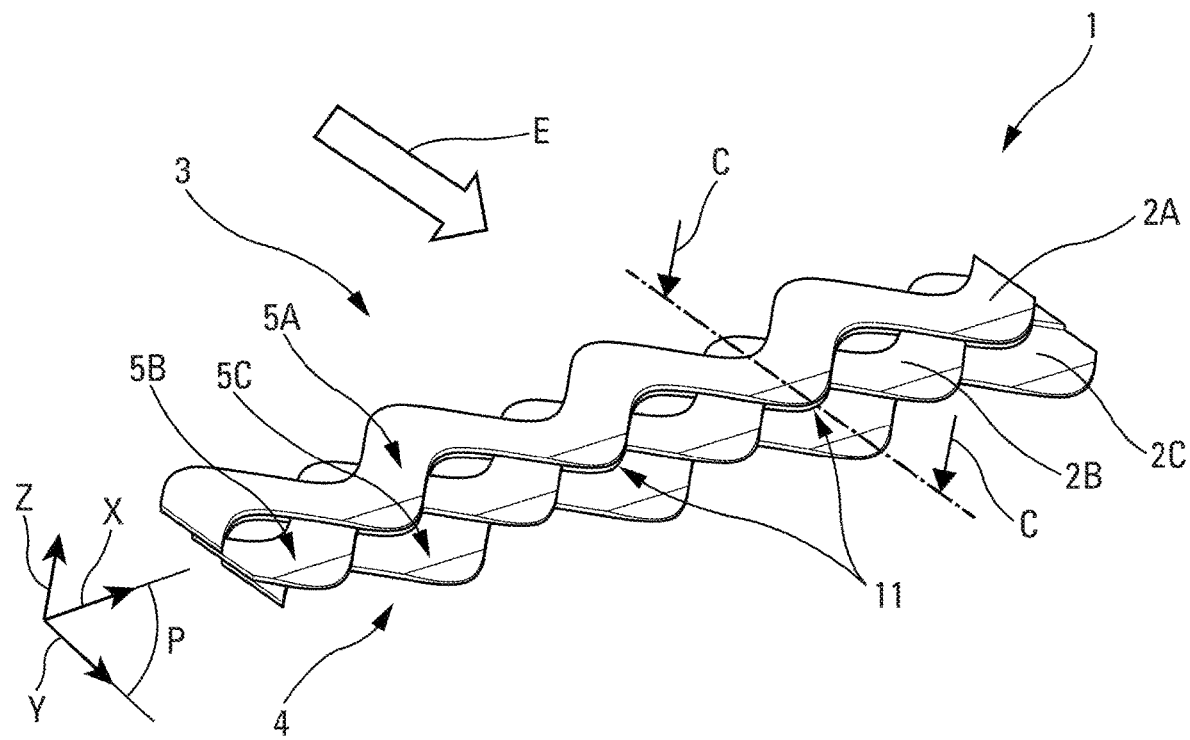
FIG. 3 is a perspective view of one particular embodiment of three strips conforming to the FIG. 2 embodiment that overlap and form openings between them.

As represented in FIGS. 1 to 3 in particular, each of the strips 2 of the porous skin 1 has an elongate shape extending in a so-called longitudinal direction X that is substantially orthogonal to a so-called lateral direction Y.

In the examples from FIGS. 1 to 7 the strips 2 and the porous skin 1 are arranged so that the direction Y (the lateral direction of the strips) corresponds to the direction of the fluid flow E. In other embodiments the strips 2 and the porous skin 1 may be arranged so that the lateral direction Y of the strips and the direction of the fluid flow E have between them a non-zero angle, although always an angle less than 90 degrees.

Moreover, as represented in FIG. 1 the porous skin 1 has a so-called external face 3 intended to be subjected to the fluid flow E and a so-called internal face 4 opposite the face 3. The direction X and the direction Y define a so-called horizontal plane P that is orthogonal to a so-called vertical direction Z. In particular, the direction Z is oriented upward. The face 3 is oriented in the sense of the direction Z and the face 4 is oriented in the sense opposite the direction Z.

In a similar way, as represented in FIG. 2 each strip 2 has an external face 5 oriented in the sense of the direction Z and an internal face 6 oriented in the sense opposite the direction Z. The faces 5 and 6 may be parallel to one another. However, in particular embodiments they may be non-parallel.

Figure 4:
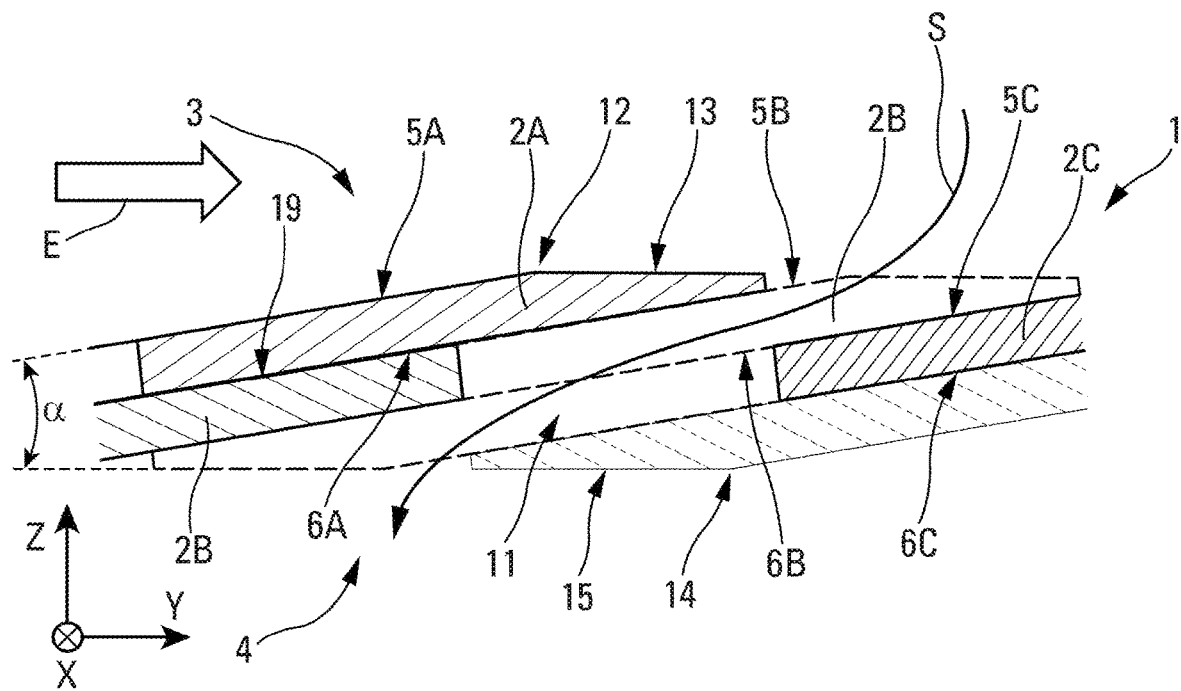
FIG. 4 is a view in section taken along a section line C-C in FIG. 3.

Moreover, as illustrated in FIG. 4 the strips 2 are inclined so that their internal and external faces are at an angle $\alpha$ relative to the horizontal plane P (and therefore substantially so relative to the fluid flow E).

The strips 2 also have two lateral edges, namely the edges oriented in the direction Y. As represented in FIG. 2 each strip 2 in particular has a so-called "upstream" lateral edge 7 (situated upstream in the direction Y, and therefore upstream in the direction of the fluid flow E) and a so-called "downstream" lateral edge 8 (situated downstream in the direction Y, and therefore downstream in the direction of the fluid flow E). The strips 2 overlapping each other laterally, the lateral edge 7 of each of them is never in direct contact with the fluid flow E while the lateral edge 8 is at least partially in contact with said fluid flow E. The lateral edge 7 has a contour 9 and the lateral edge 8 has a contour 10. Each of the contours 9 and 10 is a line with deviations.

In the context of the present invention a "line with deviations" denotes a non-straight line, that is to say a line that may include a broken line (or polygonal line), namely a succession of straight-line segments with different orientations, one or more curved lines, a serpentine shape, sinusoidal, repeating triangular shapes and/or a zig-zag shape. A contour forming a line with deviations is therefore a contour that is not completely straight (or not completely rectilinear).

Moreover, the strips 2 are arranged transversely to the fluid flow E so that each strip upstream of said flow overlaps (that is to say partly covers) the downstream strip. In particular, the arrangement of the strips 2 and the shape of the contours 9 and 10 of the lateral edges 7 and 8 are configured to form openings 11 between two successive strips 2. Moreover, the strips 2 being inclined relative to the horizontal plane P, said openings 11 formed between two strips 2 are covered at least in part by a third strip 2 situated upstream of the first two. The openings 11 are therefore accessible only from downstream of that third strip.

Moreover, the openings 11 created in this way are through-openings, and this allows sound waves to pass through said openings 11 in order to pass through the porous skin 1 following a path represented schematically by an arrow S in FIG. 4.

Nevertheless, the openings 11 make it possible to prevent the fluid flow E from penetrating into the openings 11 and therefore passing through the porous skin 1. In fact, the inclination of the strips 2 and the covering of the openings 11 by said strips 2 as described hereinabove have the effect of directing the fluid flow E along the external face 3 of the porous skin 1 over the strips 2. The fluid flow E being a movement of material oriented substantially in a given direction, it runs along the external faces 5 of the strips 2 with no possibility of accessing the openings 11. On the other hand, the sound waves that correspond to mechanical vibrations, that is to say compression and expansion of the surrounding medium, are therefore able to propagate (progressively) in all directions and in particular through the openings 11 accessible from downstream.

Moreover, the dimensions (length and section) of the openings 11 can be modified by modifying at least one of the following parameters: the shape of the contours of the lateral edges 7 and 8, the arrangement of the strips 2 relative to one another and the thickness of the strips 2.

Moreover, the strips 2 overlapping creates contact surfaces 19 (FIG. 4) between two successive strips. The contact surfaces 19 between two successive strips correspond to the interfaces (with contact) formed by longitudinal portions of the internal face of the upstream strip overlapping longitudinal portions of the external face of the downstream strip.

Moreover, the strips 2 may be fixed together at the level of at least some of these contact surfaces 19. In particular, they are fixed by gluing or by welding or any other means of known type.

Figure 5:
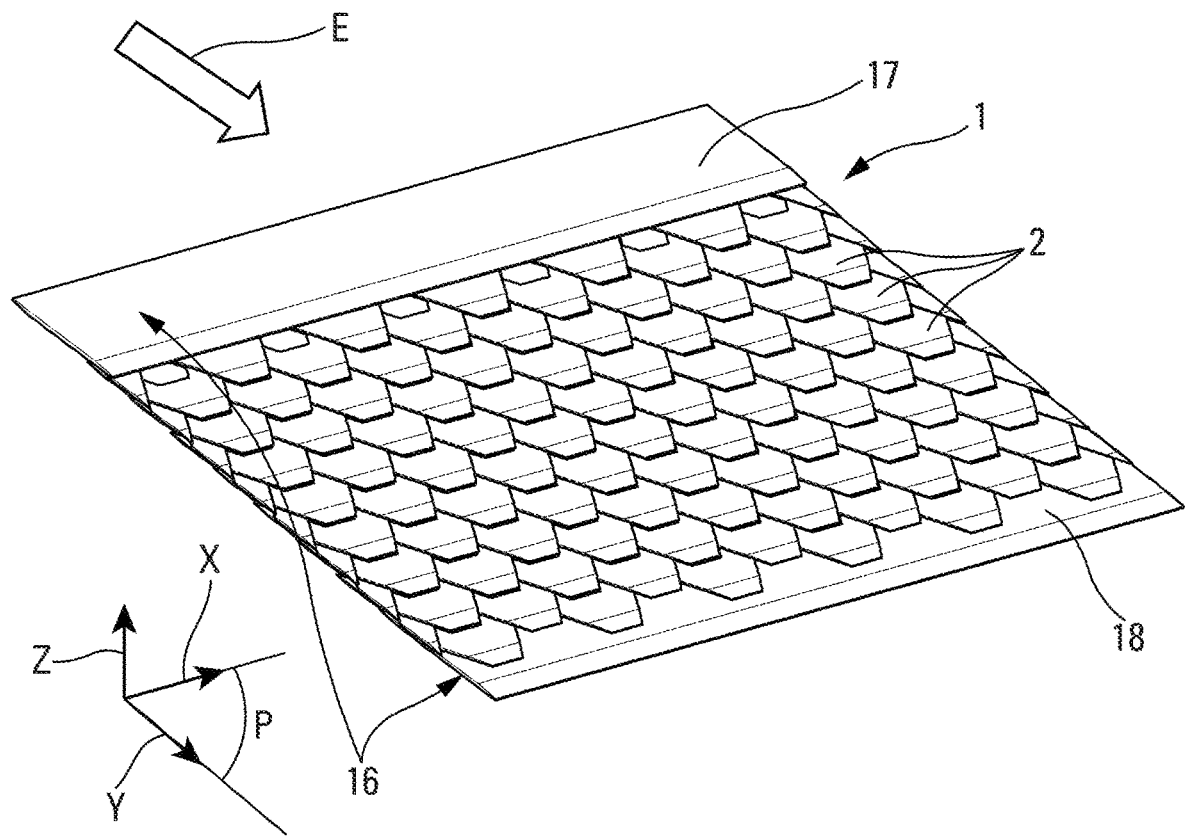
FIG. 5 is a perspective view of one particular embodiment of a porous skin including strips having lateral edges having a contour formed of trapezoidal crenellations.

In the embodiment represented in FIGS. 1 and 5, all the strips 2 of the porous skin 1 are identical. An embodiment of this kind, using a single type of strip, enables simplification of the production of the porous skin 1 and reduction of its production cost.

However, in a variant of this embodiment at least some of the strips 2 are different from one another and for example have different lengths, different widths and/or different lateral edges. In one particular embodiment of this variant the porous skin 1 includes a succession of at least two strips 2 different from one another, said succession being repeated laterally (in the direction Y) in order to form the plurality of strips 2 of the porous skin 1.

In the embodiment represented in FIGS. 1 to 3 in particular each of the two contours 9 and 10 of the lateral edges 7 and 8 is a line with deviations. As represented in FIG. 2, said contours 9 and 10 may be identical, that is to say have the same shape, and one of said contours 9 and 10 may be obtained by movement of the other contour in translation in the direction Y.

In a variant (not represented) of the preceding embodiment the shapes of the contours 9 and 10 are offset longitudinally (in the direction X) relative to one another so that one of the contours can be obtained by movement of the other contour in translation in a direction other than the direction Y.

In another variant (not represented) of the preceding embodiment the contours of the lateral edges 7 and 8 have different shapes.

Moreover, in a first particular embodiment represented in FIGS. 1 to 4 the contours 9 and 10 of the lateral edges 7 and 8 have a curved shape (that is to say a line with curves). In the example represented the curved shape is a sinusoidal shape.

Figure 6:
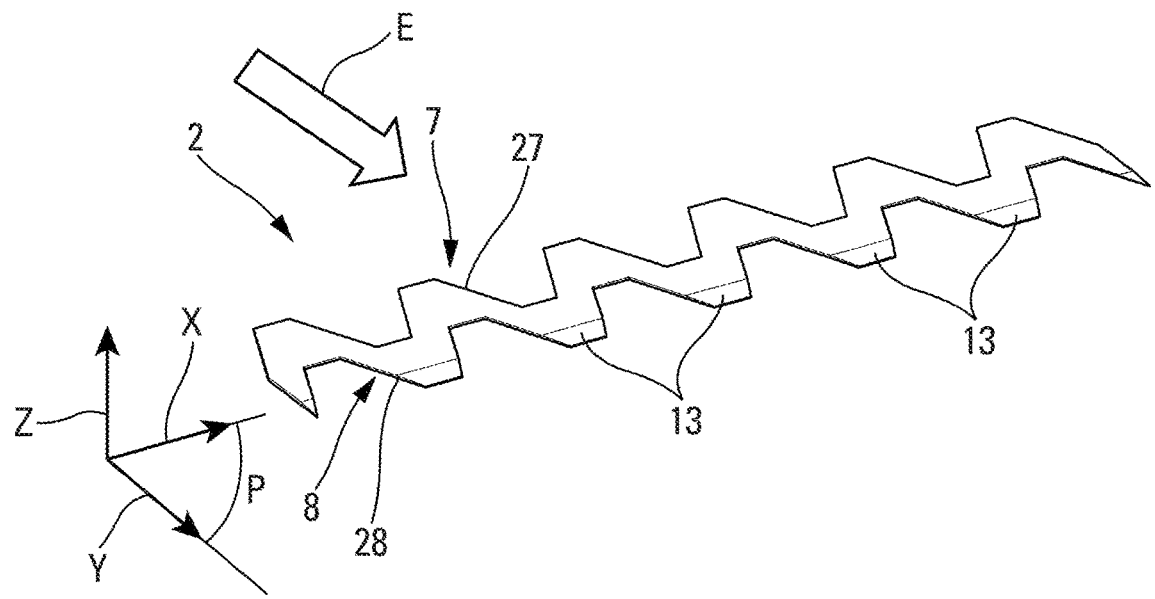
FIG. 6 is a perspective view of one particular embodiment of a strip of the porous skin from FIG. 5.

Moreover, in a second particular embodiment represented in FIGS. 5 and 6 the lateral edges 7 and 8 respectively include a contour 27 and a contour 28. Both contours 27 and 28 have a shape comprising a broken line (or polygonal line). In the example represented the shape of the broken line forming the contours 26 and 27 corresponds to a series of trapezoidal crenellations. In variants of this embodiment square, rectangular or triangular crenellations may be provided, for example.

In a third embodiment (not represented) the contours of the lateral edges comprise at least one curved line and at least one broken line.

By modifying the size and the shape of the strips 2 and in particular by modifying the shapes of the contours of their lateral edges 7 and 8 it is possible to vary the acoustic properties and/or the aerodynamic properties of the porous skin 1 and to adapt them to suit the envisaged application.

Moreover, in one particular embodiment the strips 2 have a discontinuity 12 (FIG. 2), specified hereinafter, on their external face 5 at the level of their downstream lateral edge 8. The discontinuity 12 forms a plane surface 13 at the free edge of the lateral edge 8 (FIGS. 2 and 6). The plane surface 13 is slightly inclined relative to the external face 5. The plane surface 13 may in particular be at an angle to the face 5 that is of the order of a few degrees. The discontinuity 12 extends over all the length of the strip 2 parallel to the direction X. As the contour 10, 28 of the lateral edge 8 is not straight and the discontinuity 12 is situated at the free edge of the lateral edge 8, said discontinuity 12 forms a plurality of plane surfaces 13. Each plane surface 13 is situated at a summit or a trough of the contour 10, 28, as illustrated in FIGS. 2 and 6. The plane surfaces 13 of the strip 2 are formed in such a manner as to be coplanar.

The plane surfaces 13 may be formed in such a manner as to lie in the same plane parallel to the horizontal plane P. This plane may in particular be the plane defined by the external face 3 of the porous skin 1. Thus, the plane surfaces 13 make it possible to minimize irregularities present on the surface of the external face 3 of the porous skin 1 and consequently to prevent the aerodynamic properties of the porous skin 1 from being degraded, in particular by limiting drag.

In this particular embodiment the discontinuity 12 is a chamfer. Nevertheless, in a variant of this embodiment the discontinuity 12 may equally be a bevel.

Moreover, in one particular embodiment represented in FIG. 4 the strips 2 also include on their internal face 6 at the level of the free edge of their upstream lateral edge 7 a discontinuity 14 forming plane surfaces 15. The plane surfaces 15 are slightly inclined relative to the internal face 6. The plane surfaces 15 may in particular be at an angle to the face 6 that is of the order of a few degrees. The plane surfaces 13 and 15 may be parallel to one another. Consequently, the plane surfaces 15 lie in substantially the same plane parallel to the horizontal plane P. That plane in particular may be the plane defined by the internal face 4 of the porous skin 1. Thus, the plane surfaces 15 make it possible to obtain a substantially plane face 4 that can serve as a contact surface for arranging the porous skin 1 on a wall or a face of an acoustic attenuation panel for example.

In one particular embodiment the porous skin 1 also includes a structural support 16 configured to support the plurality of strips 2.

In one particular embodiment represented in FIGS. 1 and 5 the support 16 comprises a first plate 17 arranged upstream of the porous skin 1. The plate 17 overlaps the strip or strips 2 situated most upstream of the porous skin 1. The support 16 also comprises a second plate 18 arranged downstream of the plurality of strips 2 and overlaps the strip or strips 2 situated most downstream of the porous skin 1. The strips 2 connected to the plates 17 and 18 may be fixed to the latter, for example by gluing, by welding or otherwise.

In a variant of this particular embodiment the support 17 may be any structure able to support at least some or all of the strips 2, such as a frame or a grid structure for example.

By way of example, and to explain the configuration of the porous skin 1 better, one particular embodiment of a part of the porous skin 1 comprising three successive strips is illustrated in FIGS. 3 and 4. A fourth strip is represented in thinner line in FIG. 4 in order clearly to specify the arrangement of the three successive strips described hereinafter in a porous skin 1 comprising more than three strips.

In this particular embodiment the porous skin 1 includes a first so-called upstream strip 2A, a second so-called intermediate strip 2B and a third so-called downstream strip 2C. In the remainder of the description the letter A, B or C has been added to the elements respectively forming part of the strips 2A, 2B or 2C to make clearer the arrangement of the various elements.

In this particular embodiment the strips 2A, 2B and 2C have the same shape. They are arranged parallel to one another and substantially perpendicular to the fluid flow E.

Moreover, as represented in FIG. 4, which is a view in section of the porous skin 1 in FIG. 3 on a section plane C-C, the strips 2A, 2B and 2C are inclined relative to the horizontal plane P.

To be more precise, the external faces 5A, 5B and 5C are at an angle α relative to the plane P. Thus, the external faces 5A, 5B and 5C are arranged in such a manner as to be partly in contact with the fluid flow E. The angle α may be of the order of a few degrees, e.g., 2 to 5 degrees, to obtain an internal face 3 of the porous skin 1 that is aerodynamic.

Moreover, the strip 2A is arranged in such a manner to overlap the strip 2B. In particular, part of the internal face 6A of the strip 2A is in (surface) contact with part of the external face 5B of the strip 2B.

In a similar way, the strip 2B is arranged in such a manner as to overlap the strip 2C. In particular, part of the internal face 6B of the strip 2B is in (surface) contact with part of the external face 5C of the strip 2C.

Similarly, the strip 2C is arranged in such a manner as to overlap another adjacent strip situated downstream (represented in thinner line in FIG. 4).

The arrangement of the strips 2A, 2B and 2C as described hereinabove and the shape of the contours of their lateral edges enable the openings 11 to be formed between said strips 2A, 2B and 2C. In particular, the contours of the lateral edges of the strips 2B and 2C enable a through-passage to be formed between the external face 3 and the internal face 4 of the porous skin 1. Moreover, as illustrated in FIG. 4 on the section plane C-C, the downstream lateral edge of the strip 2A enables this through-passage to be covered by overlying the strip 2B. The through-passage covered in this way by the strip 2A corresponds to the opening 11 and is no longer accessible from downstream of the porous skin 1 (that is to say it is not possible for the fluid flow E moving from upstream to downstream to penetrate into the opening 11). However, the strip 2A is not in contact with the strip 2C. The opening 11 therefore remains accessible from downstream, that is to say it is possible to penetrate into said opening 11 and to pass through the porous skin 1 by moving from downstream to upstream, as illustrated for sound waves by the arrow S.

In an application the porous skin 1 as described hereinabove may be arranged in an acoustic attenuation panel 20 as represented in FIG. 7.

The acoustic attenuation panel 20 includes an acoustic structure 21 having the porous skin 1 on one of its faces. In the context of the present invention "acoustic structure" denotes any element having acoustic absorption properties, namely able to trap, damp and/or cancel out sound waves. In particular, this may be a structure based on foam or on fibrous material.

In the embodiment represented in FIG. 7 the acoustic structure 21 of the acoustic attenuation panel 20 includes a cellular structure 22 having an upper face 23 and a lower face 24 opposite the upper face 23. The cellular structure 22 comprises cells 25 between the upper face 23 and the lower face 24.

In an implementation of this embodiment the cellular structure 22 is a honeycomb structure. However, in particular embodiments it may be other cellular structures having varied shapes and arrangements of cells.

The acoustic structure 21 also includes a so-called reflective rear skin 26 arranged on the lower face 24 of the cellular structure 22. The acoustic attenuation panel 20 may be arranged on a wall, for example by fixing the rear skin 26 to said wall.

The acoustic structure 21 also includes the porous skin 1 that is arranged on the upper face 23 of the cellular structure 22. The internal face 4 of the porous skin 1 is fixed to the upper face 23 of the cellular structure 22, for example by gluing or by welding. The porous skin 1 can in particular be fixed to the acoustic attenuation panel 20 by means of the support 16 (FIGS. 1 and 5). Moreover, the porous skin 1 is arranged so that the openings 11 face the cells 25. Thus, the space inside the cells 25 is accessible from the outside of the acoustic attenuation panel 20. Sound waves are therefore able to penetrate into the cells 25, as represented by the arrow S in FIG. 7, while the fluid flow E is not able to pass through the porous skin 1.

It is possible to adapt the position of the openings 11 of the porous skin 1 to varied architectures of the cellular structure 22 by modifying the size and the shape of the strips 2 and in particular by modifying the shapes of the contours of the lateral edges 7 and 8. Thus it is possible in particular to optimize the compatibility of the porous skin 1 with the cellular structure 22.

An acoustic attenuation panel 20 of this kind is particularly suitable for attenuating noises generated by an aircraft, for example a transport aircraft, and in particular by a propulsion system (or jet engine) of the aircraft.

The acoustic attenuation panel 20 is intended to be fixed to a wall, for example an air intake wall of a nacelle of a propulsion system. To this end the acoustic attenuation panel 20 may correspond to a plane plate, as in the example illustrated in FIG. 7. However, in particular embodiments the acoustic attenuation panel 20 may have varied shapes in order to espouse the shape of the wall on which it is intended to be arranged.

The porous skin 1 as described hereinabove that is applied to an acoustic attenuation panel 20 has numerous advantages. In particular:

it enables an acoustic attenuation panel 20 to be obtained the acoustic attenuation properties of which are very little impacted by a fluid flow E at the surface of said acoustic attenuation panel 20, the porous skin 1 in fact allowing the sound waves to penetrate to the interior of the acoustic attenuation panel 20 while preventing the fluid flow E from passing through it;

it enables limitation of irregularities on the external surface of the acoustic attenuation panel 20 and therefore good aerodynamic properties to be obtained by limiting drag, thanks to the particular arrangement of the strips 2 and to the plane surfaces 13 forming the external face 3 of the porous skin 1;

it enables modification of the acoustic and/or aerodynamic properties of the external surface of the acoustic attenuation panel 20 by adapting the size and the shape of the strips 2; and it enables an external surface of the acoustic attenuation panel 20 to be obtained on which the positions of the openings 11 can be adapted to suit varied architectures of the acoustic structure 21 and in particular of the cellular structure 22, in particular by adapting the size and the shape of the strips 2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A porous skin for an acoustic attenuation panel, said porous skin configured to be subjected to a fluid flow flowing in a flow direction over an external surface of the porous skin, the porous skin comprising:
a plurality of strips arranged transversely to the fluid flow and which successively overlap each other laterally, wherein each of the strips includes a downstream lateral edge which is entirely overlapped by at least one of the strips along an entirety of the length of the downstream lateral edge,
wherein at least one of said upstream lateral edge or said downstream lateral edge in each of the strips comprises a contour defining a line with deviations,
wherein the strips and the contours of the lateral edges of the strips are configured to form openings through the strips and between the external surface face of the porous skin and an internal face of the porous skin,
wherein the porous skin is fully covered by the strips in a direction perpendicular to the external surface,
wherein the openings are open through the porous skin along a direction opposite to the flow direction and parallel to the porous skin, and
wherein each strip is non-porous between the upstream lateral edge and the downstream lateral edge of the strip.

2. The porous skin as claimed in claim 1, wherein a plurality of said openings are shaped to match along the downstream lateral edge of a first strip of the plurality of strips and the contour of the upstream lateral edge of a second strip of the plurality of strips,
wherein the second strip is directly downstream of said first strip, and
wherein each of the plurality of the openings is covered by a third strip of the plurality of strips directly upstream of said first strip and overlying the first strip in the downstream direction.

3. The porous skin as claimed in claim 1, wherein each of the strips includes an overlapping region which has contact surface in contact with the overlapping region of an adjacent strip of the strips,
wherein the contact surface of each of the strips is fixed to the contract surface of the adjacent strip.

4. The porous skin as claimed in claim 1, wherein at least part of the contour of at least one of the upstream and downstream lateral edges comprises a curved line.

5. The porous skin as claimed in claim 1, wherein at least part of the contour of at least one of the upstream and downstream lateral edges comprises a broken line.

6. The porous skin as claimed in claim 1, wherein said strips each have a similar shape.

7. The porous skin as claimed in claim 1, wherein at least one of the strips has a shape different than another one of the strips.

8. The porous skin as claimed in claim 1, wherein a discontinuity is on a face of at least one of the upstream edge or downstream edge of each of said strips, and the discontinuity forms a planar surface on the at least one of the upstream edge or the downstream edge.

9. An acoustic attenuation panel comprising at least one acoustic structure provided with a porous skin as claimed in claim 1.

10. The acoustic attenuation panel as claimed in claim 9, wherein the acoustic structure comprises at least one cellular structure wherein a first face of each of the at least one cellular structure is covered by a reflective rear skin and a second face, opposite to the first face, is covered by the porous skin as claimed in claim 1.

11. An acoustic attenuation panel comprising:
a cellular structure having a first face and a second face opposite to the first face, wherein the first face and the second face are each aligned with openings in cells of the cellular structure;
a porous skin covering the first face, wherein the porous skin includes an external surface and the porous skin includes:
strips each having an upstream lateral edge and a downstream lateral edge opposite to the upstream lateral edge, wherein the upstream lateral edge faces upstream of a fluid flow direction proximate the first face and the downstream lateral edge faces downstream of the fluid flow direction and each strip includes a non-porous external face extending from the upstream lateral edge and the downstream lateral edge continuously along the entire length of the strip;
the downstream lateral edge in each of a plurality of the strips overlaps the upstream lateral edge of adjacent strip of the plurality of the strips;
at least one of the downstream lateral edge or the upstream lateral edge of each of the strips forms a line with deviations; and
openings are between portions of the downstream lateral edge and portions of the upstream lateral edge of adjacent pairs of the strips, wherein the openings extend between the first face of the cellular structure and a surface of the porous skin exposed to a fluid flow flowing in the fluid flow direction,
wherein the porous skin is fully covered by the strips in a direction perpendicular to the external surface of the porous skin and the openings are open through the porous skin along a direction parallel to the porous skin.

12. The acoustic attenuation panel of claim 11, wherein each of the upstream lateral edges and the downstream lateral edges form the lines with deviations.

13. The acoustic attenuation panel of claim 11, wherein the at least one line with deviations in each of the strips has at least one of a sinusoidal shape or a serpentine, shape.

14. The acoustic attenuation panel of claim 11, wherein the portion of the downstream lateral edge forming the openings is an upstream most portion of the downstream lateral edge, and
the portion of the upstream lateral edge forming the openings is a downstream most portion of the upstream lateral edge.

15. The acoustic attenuation panel of claim 11, further comprising a reflective skin covering the second face of the cellular structure.

16. The acoustic attenuation panel of claim 11, wherein the openings are regularly spaced along lengths of the strips.

17. The acoustic attenuation panel of claim 11, wherein downstream most portions of each of the strips have a first tapered surface which reduces a thickness of the strip in the fluid flow direction, and
wherein the first tapered surface faces away from the cellular structure.

18. The acoustic attenuation panel of claim 11, wherein upstream most portions of each of the strips have a second tapered surface which reduces a thickness of the strip in a direction opposite to the fluid flow direction, and wherein the second tapered surface faces towards the cellular structure.

19. The acoustic attenuation panel of claim 17, wherein upstream most portions of each of the strips have a second tapered surface which reduces a thickness of the strip in a direction opposite to the fluid flow direction, wherein the second tapered surface faces towards the cellular structure.

20. The acoustic attenuation panel of claim 11, wherein the panel is configured for a nacelle of an aircraft engine.

* * * * *